United States Patent [19]
Schuette, Jr.

[11] 3,769,660
[45] Nov. 6, 1973

[54] BUR EXTRACTOR
[75] Inventor: Roland J. Schuette, Jr., Slaton, Tex.
[73] Assignee: Triangle Mfg. Co., Inc., Slaton, Tex.
[22] Filed: May 23, 1972
[21] Appl. No.: 256,192

Related U.S. Application Data
[63] Continuation of Ser. No. 850,831, Aug. 18, 1969, abandoned.

[52] U.S. Cl. .................................. 19/202, 209/133
[51] Int. Cl. ............................................. D01g 1/00
[58] Field of Search .................. 19/88, 89, 202–205, 19/35–39, 156.3, 156.4, 156.1; 209/132–141; 56/12.8, 13.3, 16.5, 16.6, 30, 36

[56] References Cited
UNITED STATES PATENTS
| | | | |
|---|---|---|---|
| 1,009,576 | 11/1911 | Riemenschneider | 19/205 X |
| 1,105,442 | 7/1914 | Lamb | 19/36 |
| 1,941,124 | 12/1933 | Ziegler | 56/13.3 X |
| 3,278,026 | 10/1966 | Bishard | 209/133 |
| 3,312,343 | 4/1967 | Elder et al. | 209/139 |

*Primary Examiner*—Dorsey Newton
*Attorney*—Wofford & Felsman

[57] ABSTRACT

A pneumatic conveyor moves unprocessed cotton upward through a generally inverted U-shaped inlet chute. Included in the chute is an air separator that reduces air flow in a low velocity leg through which unprocessed cotton gravitates toward a bur extractor. Within the low velocity leg is a throat region and access door to facilitate manual removal of large contaminants like sagebrush. A fan, discharging air tangent to one wall of an outlet chute, generates a suction in a space defining an outlet in the bur extractor for conveying processed cotton to storage.

1 Claim, 1 Drawing Figure

PATENTED NOV 6 1973

3,769,660

INVENTOR
Roland J. Schuette, Jr.

BY
Wofford & Felsman
ATTORNEYS

BUR EXTRACTOR

This application is a continuation of U. S. Pat. application Ser. No. 850,831, filed Aug. 18, 1969, now abandoned.

BACKGROUND AND GENERAL DISCUSSION:

Picking cotton by hand is now prohibitively expensive, necessitating the origination and improvement of machines capable of efficiently performing this function. Machines for gathering cotton have been developed, but such machines have the disadvantage of collecting with the cotton portions of the stem and foliage, which are referred to hereinafter as the "bur," and other contaminants. Transporting to a stationary cotton gin, cotton including a large percentage of contaminants is disadvantageous. It becomes necessary, for example, to handle and transport a larger volume of material, much of which has limited commercial value except as humus that should thereafter be transported back to the cotton field. Moreover, the quality of the cotton processed by a stationary gin suffers when a large percentage of contaminants accompanies the unprocessed cotton.

It is therefore advantageous that machines be developed that are capable of separating contaminants from the unprocessed cotton during harvesting. The technique used in stationary gins for separating burs from cotton has been previously adapted for use in portable, bur extracting machines used during harvesting. Unfortunately, the quality of the cotton processed by such means is lower than desirable due to the presence of an excessive amount of contaminants. In my opinion the large percentage of contaminants results from the manner in which the unprocessed cotton is conveyed to and from the bur extractor or separator. Commonly, such conveying is by pneumatic means that tend to force excessive quantities of cotton as well as contaminants through the bur separator.

My invention includes a bur separator having an inlet chute A through which unprocessed cotton is conveyed, and a velocity reducing means or air separator B that preferably consists of a perforate upper section through which small contaminants escape, as well as the majority of the flowing air, to create a low velocity leg through which unprocessed cotton gravitates toward a bur separation means C. Within the low velocity leg is a throat region D having relatively small interior dimensions for trapping large contaminants such as sagebrush. An access door is provided such that these large contaminants may be manually removed from the throat region. To remove processed cotton from the bur separation means C, an outlet conveyor E, having a fan F that discharges air tangent one wall of the conveyor, is utilized. The fan arrangement generates a suction in a space G defining a processed cotton outlet from the bur separation means to prevent back flow of air through the machine. Hence, processed cotton is effectively conveyed to storage pneumatically in an efficient and advantageous manner.

Other features of my invention will become apparent in the following detailed description.

Figure 1:
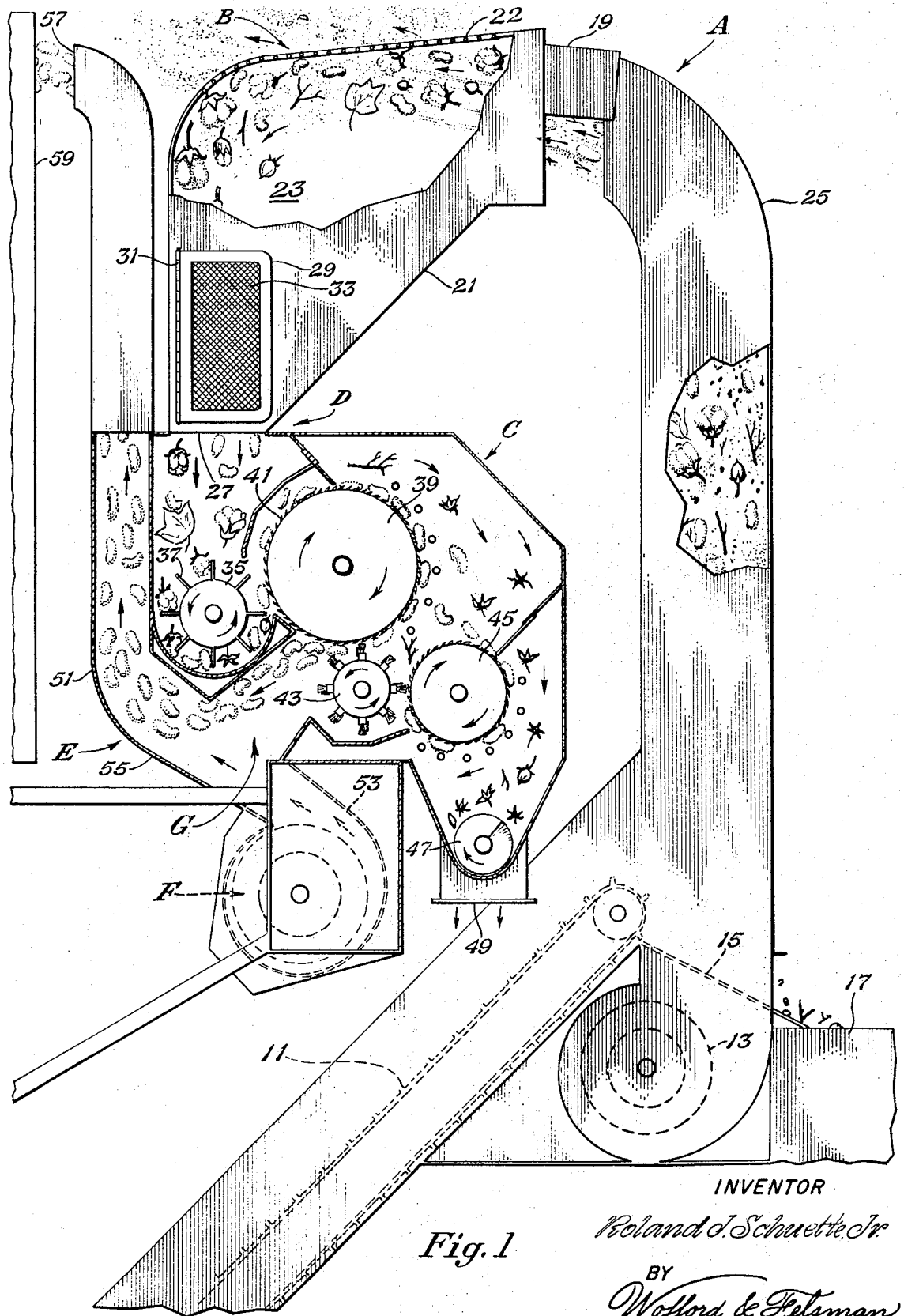
FIG. 1 illustrates the bur separator in a side elevation view, partially in section.

DESCRIPTION OF A PREFERRED EMBODIMENT:

Referring now to the drawing, the numeral 11 designates a mechanical inlet conveyor that receives harvested cotton from a harvesting machine (not shown) portably mounted generally upon a tractor. The mechanical conveyor 11 discharges unprocessed cotton, which includes the bur, green bolls and other contaminants into a lower region of the inlet chute A. Included in inlet chute A is a "green boll separator," which is a portion of a pneumatic inlet conveyor. Relatively high velocity inlet flow of air is generated by a fan 13 connected with the lowermost region of the inlet chute A. An inclined grate 15 is disposed across the inlet chute A above the fan 13. Green cotton bolls have a relatively high density such that they cannot be conveyed upward as effectively as opened cotton. Hence, the green bolls fall backward through the inlet chute A and roll down the inclined grate 15 into a collection bin 17. Green boll separators of the above described type have been previously developed and are commercially available from the Triangle Manufacturing Company, Inc., Model No. 884 for example.

As shown in the drawing, the inlet chute A has a generally inverted U-shape that includes an opened bottom hood 19 leading to a velocity reducing means or air separator B that consists in this instance of a perforate section 22, the perforations of which are sized to permit the discharge of small contaminants such as dirt, while confining the unprocessed cotton within the chute.

The velocity reducing means or air separator B creates in inlet chute A a low velocity leg 21 in which the pressure returns to essentially atmospheric, enabling the unprocessed cotton to fall by gravity through what is referred to as a "gravitation zone" 23 within the low velocity leg 21. The term "low velocity" is contrasted with the high velocity air flow within the high velocity leg 25. The gravitation zone 23 has large cross-sectional dimensions to create an air tank, which is another vay of reducing fluid velocity.

Within the gravitation zone of the low velocity leg 21 is a throat region 27 having narrow interior dimensions to entrap large contaminants such as sagebrush that may travel beyond an opened bottom hood 19 of the inlet chute A. Centrifugal force and the velocity of the flowing air carry the unprocessed cotton past the hood 19 into the low velocity leg 21. Associated with the gravitation zone 23 and throat region 27 is an access door 29, hinged at 31 to enable manual removal of accumulated large contaminants. It is preferable that the access door 29 include a screened portion 33 or other means enabling visual inspection of the throat region 27 so that the operator of the machine may conveniently inspect for the presence of large contaminants.

Connected with and below the throat region 27 is a bur separation means C having a general configuration of a type previously utilized. Unprocessed cotton first engages a spiked drum 35 disposed beneath the throat region 27 of the low velocity leg 21. The velocity of the spikes 37 of the drum 35 is sufficient to separate the majority of the cotton from its bur and impel the resulting separated materials toward a primary saw toothed drum 39, the teeth 41 of which secure the cotton and move it toward a brush 43 having a cylindrical form rotating in a direction opposite to the saw toothed drum 39 but in the same direction usually as the spiked drum 35. The brush 43 removes cotton from the saw toothed drum 39 and impels it toward the outlet conveyor E. A secondary or reclaimer saw toothed drum 45, rotating generally in the same direction as the first saw toothed drum 39, impales cotton which escaped the first drum. The secondary drum 45 is disposed adjacent the brush 43 such that the impaled cotton is impelled toward the first drum 39 and hence ultimately toward the outlet conveyor E.

The burs and other contaminants fall downward past the first saw toothed drum 39 and the secondary saw toothed drum 45 toward a trash conveyor 47, preferably of the auger type, that may be utilized to distribute the contaminants over the cotton field through an outlet 49. The outlet conveyor E includes an outlet chute 51 connected with a fan F, the exhaust 53 of which discharges air tangent the lower wall 55 of the outlet chute 51. The interior dimensions of the outlet chute 51 are sized such that the pressure head in the chute is minimized to create a suction within the space G that defines a processed cotton outlet from the bur separation means C. Thus, processed cotton is drawn into the outlet chute in a manner preventing backflow of air through the bur separation means. The outlet chute 51 extends upward with its outlet 57 disposed adjacent a storage area 59.

In operation, the machine is transported across a field of cotton as an integral portion of a harvester (not shown) that conveys unprocessed cotton through the conveyor 11 to the bottom region of the high velocity leg 25 of inlet chute A. Harvested green bolls fall upon the inclined grate 15 disposed inside the high velocity leg 25, while lighter density particles, including cotton, are forced upward in the stream of air generated by the inlet fan 13. Green bolls are collected in the collection bin 17, while the remaining unprocessed cotton is conveyed into the gravitation zone 23 in which the velocity of the fluid is decreased with assistance from the perforate section 22 of the pressure reducing means B. Large contaminant particles that fall downward may become lodged in the throat region 27 of the low velocity leg 21 and may be examined and removed manually through the access door 29. The cotton is processed with assistance from the spiked drum 35, the first saw toothed drum 39, the secondary saw toothed drum 45 and the brush 43, resulting in the accumulation of contaminants in the region of the trash conveyor 47 and outlet 49 that may be used to distribute the contaminants over the cotton field. Processed cotton is impelled through the suction zone G of the outlet conveyor E by the fan F, travelling through the outlet chute 51 to the storage area 59.

It should be apparent from the foregoing description I have provided an invention having significant advantages. The utilization of a pneumatic conveyor and the inlet chute A enables the provision of a gravitation zone through which unprocessed cotton may flow to the bur separation means C. The utilization of the pressure reducing means B, preferably in the form of a perforate section 22 creates a low velocity leg 21 and the desired gravitation zone 23. This feature of the invention prevents the high velocity flow of air and particles through the bur separation means, thereby preventing overload of the bur separation means and an accompanying decrease in the quality of the processed cotton. Further, the utilization of a throat region 27 and access door 29 permit visual inspection of the flow of unprocessed cotton to the bur separation means C and the removal of large contaminants that are entrapped by the throat region. Conveyance of processed cotton is effected by a fan F disposed with an outlet chute 51 of the outlet conveyor E in a manner to create a space G of pressure below atmospheric that assists in efficiently gathering the processed cotton. Thus there is no tendency to blow processed cotton backward through the bur separation means C, and at the same time a large volume of processed material may be conveyed in an advantageous, pneumatic method.

While I have shown my invention in only one of its forms, it should be apparent that it is not so limited but is susceptible to various changes and modifications without departing from the spirit thereof. I claim:

1. A bur extractor comprising:

an inlet chute having generally an inverted U-shaped,
an inlet fan connected with said chute upstream from said perforate section to create a high pressure leg to pneumatically convey unprocessed cotton upward,
means for moving unprocessed cotton into said inlet chute at a position between said inlet fan and said perforate section for conveyance upward,
a pressure reducing means including an upper perforate section in the inlet chute to reduce the pressure to essentially atmospheric and thus, create a low pressure leg through which unprocessed cotton gravitates,
bur separation means connected with and receiving unprocessed cotton from the low pressure leg,
an outlet conveyor connected with the bur separation means to convey processed cotton to storage
said outlet conveyor comprising: an outlet chute extending upward from the bur separation means,
a fan connected with said outlet chute to generate air flow substantially tangent to one wall thereof and adjacent a space defining a processed cotton outlet from the bur separation means to generate a suction in said space to draw processed cotton into the outlet chute and prevent backflow of air through the bur separation means.

* * * * *